US012739115B2

(12) United States Patent
Cambou et al.

(10) Patent No.: US 12,739,115 B2
(45) **Date of Patent: *Sep. 15, 2026**

(54) PROTOCOLS WITH NOISY RESPONSE-BASED CRYPTOGRAPHIC SUBKEYS

(71) Applicant: Arizona Board of Regents on Behalf of Northern Arizona University, Flagstaff, AZ (US)

(72) Inventors: Bertrand F Cambou, Flagstaff, AZ (US); Michael L Garrett, Flagstaff, AZ (US); Michael Partridge, Flagstaff, AZ (US); Dina Ghanaimiandoab, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/885,226

(22) Filed: Sep. 13, 2024

(65) Prior Publication Data

US 2025/0167997 A1 May 22, 2025

Related U.S. Application Data

(63) Continuation-in-part of application No. 18/638,593, filed on Apr. 17, 2024.

(Continued)

(51) Int. Cl.

| | |
|---|---|
| ***H04L 9/08*** | (2006.01) |
| ***H04L 9/06*** | (2006.01) |
| ***H04L 9/32*** | (2006.01) |

(52) U.S. Cl.
CPC .......... *H04L 9/0894* (2013.01); *H04L 9/0643* (2013.01); *H04L 9/0656* (2013.01); *H04L 9/0869* (2013.01); *H04L 9/3271* (2013.01)

(58) Field of Classification Search
None
See application file for complete search history.

(56) References Cited

U.S. PATENT DOCUMENTS

| | | | |
|---|---|---|---|
| 6,219,439 | B1 | 4/2001 | Burger |
| 7,769,206 | B2 | 8/2010 | Monden |

(Continued)

FOREIGN PATENT DOCUMENTS

| | | |
|---|---|---|
| CN | 114065167 | 2/2022 |
| EP | 2536061 | 12/2012 |

(Continued)

OTHER PUBLICATIONS

I. Adjabi et al., "Past, Present, and Future of Face Recognition: A Review; Electronics," DOI: 10/3390/electronics9081188, Jul. 2020.

(Continued)

*Primary Examiner* — Bassam A Noaman
(74) *Attorney, Agent, or Firm* — Quarles & Brady LLP

(57) ABSTRACT

Methods for the storage and retrieval of a digital file are disclosed. The file is encrypted with a random binary key. A mathematical challenge-response-pair (CRP} mechanism is used to generate an ordered list of responses from a list of challenges. A subset of responses within the ordered list of responses is selected, which each selected response occupying a position in the ordered list that is the same position as a first binary symbol in the random key. In this way, the key can be encoded in the selection of responses. To recover the key, the selected responses are compared to a full list of responses to determine which of the responses in the full list match selected responses. Matches indicate the first binary (Continued)

symbol in the corresponding position in the key and non-matches indicate the second binary symbol. In this way, the key is reconstructed, and file may be decrypted.

13 Claims, 8 Drawing Sheets

Related U.S. Application Data

(60) Provisional application No. 63/538,379, filed on Sep. 14, 2023, provisional application No. 63/459,938, filed on Apr. 17, 2023.

(56) References Cited

U.S. PATENT DOCUMENTS

| | | | |
|---|---|---|---|
| 10,503,890 B2 | 12/2019 | Cambou et al. | |
| 10,558,974 B2 | 2/2020 | Smith et al. | |
| 11,044,101 B2 | 6/2021 | Kaehler | |
| 11,394,706 B2 | 7/2022 | Lin et al. | |
| 11,411,750 B2 | 8/2022 | Kannan et al. | |
| 11,470,039 B2 | 10/2022 | Gould et al. | |
| 2011/0026781 A1 | 2/2011 | Osadchy et al. | |
| 2012/0014520 A1 | 1/2012 | Baughman | |
| 2013/0148868 A1 | 6/2013 | Troncoso Pastoriza et al. | |
| 2016/0078252 A1* | 3/2016 | Chandra | G06F 21/72 713/190 |
| 2017/0048216 A1 | 2/2017 | Chow et al. | |
| 2017/0243193 A1 | 8/2017 | Manian et al. | |
| 2018/0205555 A1 | 7/2018 | Watanabe et al. | |
| 2019/0165956 A1* | 5/2019 | Adham | H04L 9/0866 |
| 2020/0076624 A1* | 3/2020 | Cambou | H04L 9/0643 |
| 2020/0322132 A1 | 10/2020 | Covaci et al. | |
| 2021/0036875 A1 | 2/2021 | Kim et al. | |
| 2021/0152347 A1* | 5/2021 | Cambou | H04L 9/0858 |
| 2021/0226804 A1 | 7/2021 | Uhr et al. | |
| 2022/0188393 A1 | 6/2022 | Forte et al. | |
| 2023/0045288 A1 | 2/2023 | Cambou et al. | |
| 2023/0336366 A1* | 10/2023 | Davies | H04L 9/0825 |
| 2024/0214224 A1 | 6/2024 | Cambou et al. | |
| 2024/0348436 A1 | 10/2024 | Cambou et al. | |

FOREIGN PATENT DOCUMENTS

| | | |
|---|---|---|
| WO | 2014131557 | 9/2014 |
| WO | 2015075664 | 5/2015 |

OTHER PUBLICATIONS

M. Blatt et al., Optimized Homomorphic Encryption Solution for Secure Genome-Wide Association Studies, BMC Med Genomics, doi: 10.1186/s12920-020-0719-9, Jul. 2020.

B. Chen et al., "Fourier-Transform-Based Surface Measurement and Reconstruction of Human Face Using the Projection of Monochromatic Structured Light," Sensors, 21(7), 2529; https://doi.org/10.3390/s21072529, 2021.

M. Faundez-Zanuy et al., "Face Recognition in Transformed Domain, "IEEE Ccst, doi: 10.1109/CCST.2003.1297575, Oct. 2003.

L. Feng et al., "Image Recognition and Encryption Algorithm Based on Artificial Neural Network and Multidimensional Chaotic Sequence," Comput Intell Neuroscience, doi: 10.1155/2022/9576184, Aug. 2022.

R. Jafri et al., "A Survey of Face Recognition Techniques," Journal of Information Processing Systems, DOI 10.3745/JIPS.2009.5.2.041, Jun. 2009.

A. Khan et al., "Secure Facial Recognition in The Encrypted Domain Using a Local Ternary Pattern Approach," Journal of Information Security and Applications, vol. 59, https://doi.org/10.1016/j.jisa.2021.102810, Jun. 2021.

L. Li et al., "A Review of Face Recognition Technology," IEEE Access, DOI: 10.1109/ACCESS 2020.30111028, Aug. 2020.

H. Lu et al., Face Recognition with Biometric Encryption for Privacy-Enhancing Self-Exclusion, International Conference on Digital Signal Processing, DOI:10.1109/ICDSP.2009.5201257, Aug. 2009.

A. Marrugo et al., "Fourier Transform Profilometry in LabVIEW," http://dx.doi.org/10.5772/intechopen.78548, Nov. 2018.

P. Phillips et a., "FERET (Face Recognition Technology) Recognition Algorithms Development and Test Results," Army Research Laboratory, ARL-TR-995, Oct. 1996.

P.A. Tresadern et al., "Combining Local and Global Shape Models for Deformable Object Matching, "BMVC 2009: 1-12.

P.A. Tresadern et al., "Face Alignment Models, "Handbook of Face Recognition 2011: 109-135.

H. Zhi et al., "Face Recognition Based on Generic Algorithm," Journal Vis. Commun. Image R., https//doi.org/10.1016/jvcir.2018.12.012, 2018.

* cited by examiner

| Responses | $r_1$ | $r_2$ | $r_3$ | $r_4$ | $r_5$ | $r_6$ | $r_7$ | $r_8$ |
|---|---|---|---|---|---|---|---|---|
| Key K | **0** | **1** | **1** | **0** | **1** | **0** | **0** | **1** |
| Subset | - | $r'_1=r_2$ | $r'_2=r_3$ | - | $r'_3=r_5$ | - | - | $r'_4=r_8$ |

FIG. 4

| Subset $O_{SR}$ | $r'_1$ | | $r'_2$ | | $r'_3$ | | $r'_4$ | |
|---|---|---|---|---|---|---|---|---|
| Responses | $r_1$ | $r_2=r'_1$ | $r_3=r'_2$ | $r_4$ | $r_5=r'_3$ | $r_6$ | $r_7$ | $r_8=r'_4$ |
| Key K | 0 | 1 | 1 | 0 | 1 | 0 | 0 | 1 |

FIG. 5

| Number of errors | 0 | 1 | 2 | 3 |
|---|---|---|---|---|
| AES – Latencies in s | $10^{-8}$ | $2.5\ 10^{-6}$ | $3.2\ 10^{-4}$ | $2.7\ 10^{-2}$ |
| Dilithium- Latencies in s | $10^{-5}$ | $2.5\ 10^{-3}$ | 0.3 | 27 |

FIG. 6

| Number of errors | 0 | 5 | 10 | 20 |
|---|---|---|---|---|
| AES – Latencies in s | $1\ 10^{-8}$ | $3.2\ 10^{-7}$ | $1\ 10^{-5}$ | $1\ 10^{-2}$ |
| Dilithium – Latencies in s | $1\ 10^{-5}$ | $3.2\ 10^{-4}$ | $1\ 10^{-2}$ | 10 |

FIG. 7

| Normal tolerance | 10% | 10% | 10% | 10% |
|---|---|---|---|---|
| Noise injected | 0% | 5% | 10% | 15% |
| Dynamic tolerance | 10% | 15% | 20% | 25% |

FIG. 8

PROTOCOLS WITH NOISY RESPONSE-BASED CRYPTOGRAPHIC SUBKEYS

CROSS-REFERENCE TO RELATED APPLICATIONS

The present application is a continuation-in-part of U.S. patent application Ser. No. 18/638,593 entitled "Protocols With Noisy Response-Based Cryptographic Subkeys," filed Apr. 17, 2024, which claims priority to U.S. Provisional Application 63/459,938 entitled "Protocols with Noisy Response-Based Cryptographic Subkeys," filed on Apr. 17, 2023, the entirety of which is incorporated herein by reference. The present application also claims priority to U.S. Provisional Application 63/538,379 entitled "Protocols With Noisy Response-Based Cryptographic Subkeys," filed Sep. 14, 2023, the entirety of which is incorporated herein by reference.

STATEMENT REGARDING FEDERALLY-SPONSORED RESEARCH

Not Applicable.

BACKGROUND

It is risky to store and distribute the cryptographic keys needed to protect sensitive information in terminal devices (i.e., computing devices located in untrusted environments). Some of the possible vulnerabilities for such keys include replays, man in the middle attacks, loss of information in the network, side channel analysis, and physical loss to the opponent of terminal device. Storing non-encrypted files in the terminal is as risky as storing the secret keys decrypting the cipher texts of these files. In distributed networks, the clients usually store the public/private key pairs in their terminal devices which present an element of risk.

Additionally, even if storage of keys and encrypted files is safe, malicious actors can inject noise (i.e., "jam") to disturb the wireless communication between ground or central devices and a terminal device, making the distribution of cryptographic keys difficult without heavy error correction codes (ECC), fuzzy extractors, and data helpers. These sorts of error correction methods require terminal devices to carry heavy processor loads, and the use of such helper data discloses information which is useful to an attacker.

BRIEF SUMMARY

Embodiments of the invention are directed to a systems and methods to protect digital files and to allow for transmission of sensitive digital data in noisy or hostile environments. The instant disclosure suggests solutions to these problems based on building challenge-response-pair (CRP) mechanisms from the message digests of stored or to-be-transmitted digital files themselves. Inventive embodiments are directed to solutions to the problems of digital file security and security of transmission based on i) one-time use keys for each transaction, ii) generating keys from the message digest of each file and iii) in extreme cases of zero-trust networks; transmitting the data feeding a CRP mechanism through noisy wireless channels to enable the decryption on-demand of digital files. All proposed remedies are designed to handle the erratic bits without ECC.

The solutions disclosed herein is paper enable the rapid verification of the authenticity of digital files and their deciphering. Two use cases are considered: the protection and verification of authenticity of the information distributed in storage nodes and the protection of the files kept in terminal devices operating in contested zero-trust environments comprised of weak signals in the presence of obfuscating electromagnetic noise. With the use of nonces, the message digests of hashed digital files can be unique and unclonable; they can demonstrate similar advantages to Physical Unclonable Functions (PUF)s in challenge-response mechanisms, that is, they can be unique, unpredictable, and demonstrate one-wayness.

In the inventive embodiments, there is an enrollment process, in which randomly selected "challenges" are applied to digital data to elicit unique output data known as the "responses". This process enables the generation and distribution of cryptographic keys. During verification cycles, the CRP mechanisms are repeated for proof of authenticity and deciphering. The proposed mechanisms accommodate the injection of obfuscating noises to mitigate several vectors of attacks and to disturb opponents trying to perform side channel analysis of the terminal devices. The methods suggested to distribute error free cryptographic keys in noisy networks are implemented with light computing elements and do not rely on Error Correcting Codes (ECC), fuzzy extractors, or data helpers.

The inventive methods provide a function to map challenges (input digital data streams) to responses (output digital data streams) in a way that has low collision and high one-wayness (i.e., possession of a response yields very little information the challenge that elicited it). Additionally, because the challenges are based on the content of the digital files to be protected themselves, the disclosed methods demonstrate a high level of unclonability—it is unlikely to be able to generate the mapping function without possession of the file itself, which is unique.

For response generation with a file-based CRP, the input data of the CRP mechanism is a digital file C of different length that is converted into a digital stream C* after concatenation with nonce ω randomly generated, e.g., with a random number generator (RNG). The length of C* is kept at the fixed length $d=2^D$ wherein D is the number of digits (for example, d=1024 and D=10). The resulting d bits are located at addresses varying from 1 to d. An exemplary method to achieve such a fixed length is to hash and extend C with an extended output function (XoF). The combination of SHA-3 and SHAKE is compliant with NIST current standards. Under the disclosed method, a "challenge" is generally the digital information needed to point at a particular position in the d-bit long stream C*. A stream of bits S* is generated by hashing and extending with a XoF a randomly selected seed S. The stream S* is segmented into N challenges $\{q_1, \ldots, q_i, \ldots, q_N\}$ that are D-bits long. The D bits of each challenges $q_i$ are converted into a number $x_i$, with $x_i \in \{1, d=2^D\}$, which is turned into an address in C*. The resulting N addresses $\{x_1, \ldots, x_i, \ldots, x_N\}$ are generating the N responses $\{r_1, \ldots, r_i, \ldots, r_N\}$ that are P-bit long. From each address $x_i$, P-bit long responses are generated from C*. Algorithm 1, below, summarizes this protocol. The output data managed after response generation is {C}, {ω, S}, and $\{r_1, \ldots, r_i, \ldots, r_N\}$.

Algorithm 1: Generation of a Set of Responses with C

1) Enter variable input data: {C}
2) Randomly pick 256-bit long nonce {ω}
3) Randomly pick stream {S}
4) Module 1: Generate a set of responses with C and {ω, S}
   i. Enter fixed input data: integers d, D with $d=2^D$, N, P, and prime numbers α and β These numbers may be fixed parameters, used every time a system implements the method. These may be public information, or may be shared between devices secretly.
   ii. Generate d-bit lone C*
      i. Hash C to some fixed output, e.g., with SHA-256
      ii. Concatenate digest with ω
      iii. Form C* by extending the concatenated stream with SHAKE
      iv. Organize C* (i.e., break C* into d sequential segments) with bits located at addresses 1 to d. The resulting organized C* will be the CRP mechanism - it contains addressable responses at addresses 1 to d.
   iii. Form S* by hashing and extending S to a NxD-bit long stream of bits
      i. Segment S* into D-bit long challenges $\{q_1, ..., q_i, ..., q_N\}$; $i \in \{1, d=2^D\}$. Each of these D-bit long segments of S* will, randomly, point to an address, 1 to d.
   iv. Point at positions $\{x_1, ..., x_i, ..., x_N\}$ in C* from $\{q_1, ..., q_i, ..., q_N\}$; $x_i \in \{1, d=2^D\}$
   v. Generate N responses $\{r_1, ..., r_i, ..., r_N\}$ from $\{x_1, ..., x_i, ..., x_N\}$
      i. For each $x_1$, point at positions $\{x_{(i,1)}, ..., x_{(i,j)}, ..., x_{(i,P)}\}$ in C* with $j \in \{1, P\}$
         1. Start with j=1: $x_{(i,j-1)} = x_i$
         2. Iterate $x_{(i,j)} = (\alpha\, x_{(i,j-1)} + \beta) \bmod (2^D)$
      ii. Generate P-bit long $r_i$: For each $x_i$, read C* in the positions $\{x_{(i,1)}, ..., x_{(i,j)}, ..., x_{(i,P)}\}$
      iii. Combine the N responses $r_i$ to get $\{r_1, ..., r_i, ..., r_N]$
   vi. Output: The N, P-bit long responses $\{r_1, ..., r_i, ..., r_N\}$
5) Output: C, {S, ω} and the N responses $\{r_1, ..., r_i, ..., r_N\}$
END As the algorithm set forth above demonstrates, an arbitrary starting digital file C, along with the ability to generate nonces and other arbitrary or random numbers, may be used to generate a CRP mechanism, where challenges can be selected, and provided to a function, which converts C to C*, to elicit responses, with a high degree of unclonability, one wayness and low collisions. Specifically, the algorithm set forth can generate an orderly set of responses, N responses $\{r_1, \ldots, r_i, \ldots, r_N\}$ from file C and the random streams {ω, S}. Specific subsets of f of N responses $\{r'_1, \ldots, r'_j, \ldots, r'_f\}$ can be used in the methods that follow in conjunction with an ephemeral key K, which is picked randomly with a random number generator (RNG). Specifically, a random key K is generated and the positions of 1s and 0s (or more generally, a first binary symbol and a second binary symbol) are determined. Responses within N at the positions of 1 in K (a first binary symbol) are kept, and the N-f positions with a state of "0" are skipped. The resulting orderly subset of f responses is kept for future operation. Key K may used to encrypt message M and generate the ciphertext M*. This basic method is advantageously used in various practical embodiments, as will be demonstrated in the description of the preferred embodiments that follow.

The use of a subset of ordered responses from a CRP mechanism to encode the positions of a first binary symbol (e.g., the 1s) in a binary encryption key is discussed below, and also in detail in U.S. Provisional Application 63/459,933 entitled "Biometry With Challenge-Response-Pair Mechanism," filed Apr. 17, 2024, the entirety of which is incorporated herein by reference.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

FIGS. 4-8 are various data tables illustrating examples of methods of key sharing and generation according to some embodiments.

DETAILED DESCRIPTION

Figure 1:
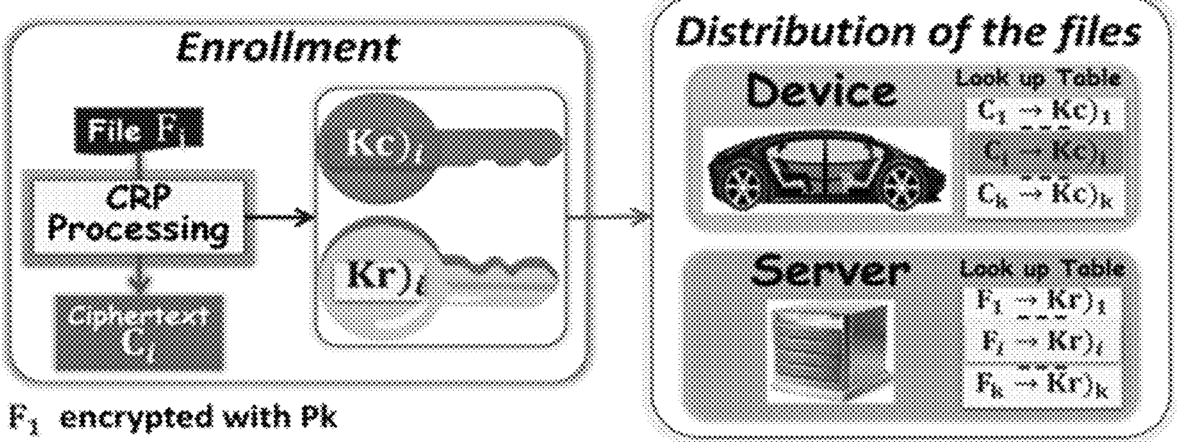
FIG. 1 conceptually depicts the use of the embodying methods to distribute encrypted files to terminal devices.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

It is contemplated that, in preferred embodiments, the methods described below will be carried out in a computing environment including at least two computing devices in electronic communication with one another. The first device will be referred to as a "server", "central" or "ground" device, and the second device will be referred to as a "client" or a "terminal" device. References to "users" refer generally to individuals accessing a particular computing device or resource, to an external computing device accessing a particular computing device or resource, or to various processes executing in any combination of hardware, software, or firmware that access a particular computing device or resource. Both the client and server devices are, preferably, general purpose computing devices, which may include non-volatile storage, a programmable processor, input/output devices, and network interface devices. The non-volatile storage may encode computer readable instructions that, when executed, cause the processors in the server and client devices to execute the method steps described throughout this disclosure.

A first use of the CRP mechanism described above is to encrypt a digital file M for storage. An algorithm for such encryption is set forth below:

Algorithm 2: Generation of a Subset of Responses with C and Encryption of M

1) Enter variable input data: {C}, {M}
2) Randomly pick 256-bt long nonce {ω}
3) Randomly pick stream {S}
4) Use Module 1: Generate a set of responses with C and {ω, S}
    i. Output: The N, P-bit long responses $\{r_1, \ldots, r_i, \ldots, r_N\}$
5) Module 2: Encrypt M and generate a subset of responses with $\{r_1, \ldots, r_i, \ldots, r_N\}$
    i. Randomly pick key K: $\{k_1, \ldots, k_i, \ldots, k_N\}$ with f states of 1, N-f states of 0
    ii. Let M* = M encrypted with key K
    iii. Store the subset of f responses $\{r'_1, \ldots, r'_j, \ldots, r'_f\}$ located at the positions of key K with a state of "1" with $j \in \{1, f\}$
    iv. Erase the subset of N-f responses located at the positions of K with a state of "0" and erase {M, K}
    v. Output: {M*} and the f P-bit long responses $\{r'_1, \ldots, r'_j, \ldots, r'_f\}$
6) Output: C, {S, ω, M*} and the f responses $\{r'_1, \ldots, r'_j, \ldots, r'_f\}$

END

As will be noted, in order to decrypt M*, the ephemeral key K must be recovered by comparing the full sequence of N responses with the subset of f orderly responses generated in early operations. This permits the device implementing the decryption algorithm to determine the positions in the sequence of N responses where responses match the subset of f responses. To reconstruct the key K, the positions in N for which there are stored matching responses are assigned 1s, and all other positions are assigned 0 (although the reverse is possible). Thus, the key generation scheme involves regenerating the full set of N responses, $\{r_1, \ldots, r_i, \ldots, r_N\}$, and for each stored response in subset f, $\{r'_1, \ldots, r'_j, \ldots, r'_f\}$ comparing each r' with each of $\{r_1, \ldots, r_i, \ldots, r_N\}$ to find the response in N that matches. Since these responses are mathematically deterministic, where there is a match, it should be exact, e.g., r1−r'1 should be zero. But in alternative embodiments, where responses are being transmitted in a hostile/noisy environment and may be corrupted, a match can be determined by measuring a Hamming distance, applying a threshold, and determining a match if the Hamming distance is below some threshold. When the key K is recovered, stored cipher text M* is decrypted to reveal M. Any suitable encryption algorithm may be used here for encryption/decryption, for example, by the algorithms discussed below.

A decryption algorithm for M is set forth below:

Algorithm 3: Decryption of M with C and the subset of f responses

1) Enter variable input data: C, {S, ω, M*}, and the f P-bit long responses $\{r'_1, \ldots, r'_j, \ldots, r'_f\}$
2) Use Module 1: Generate a set of responses with C and {ω, S}
   i. Output: The N, P-bit long responses $\{r_1, \ldots, r_i, \ldots, r_N\}$, $j \in \{1, P\}$
3) Module 3: Decrypt M from M* and the f responses $\{r'_1, \ldots, r'_j, \ldots, r'_f\}$, $j \in \{1, P\}$
   i. Retrieve key K by comparing the N responses $r_1$ with the subset of f responses $r'_j$
      i. The state in position "i" of K is "1" when $r_1$ is matching with one of the $r'_j$
      ii. The state in position "i" of K is "0" when $r_1$ is matching with none of the $r'_j$
   ii. Let M = M* decrypted with K
   iii. Output: {M}
4) Output: M

END

The basic schemes above are extended, in certain embodiments, to protect and provide security for communication between two or more computing devices in insecure and noisy environments. In zero-trust networks, protocols cannot rely on third party validations, and thus, information is restricted to a small group of participants. The methods described herein enable a controlling party to drive the deciphering of the files stored in one or more terminal devices through a zero-trust network. The transfer of information from the controlling party to the device can be obfuscated with heavy electromagnetic noise, either because the signals are weak, or on purpose to protect the device against a variety of attacks, including side channel analysis. The digital file-based CRP mechanisms incorporate ephemeral keys randomly picked, and the generation of an orderly subset of the sequence of responses (OSR) in which obfuscating noise can be injected. In these methods, there is an initial enrollment cycle for terminal devices, that preferably occurs in a secure environment (e.g., before terminal devices are deployed into the world). Later, after deployment the methods to be described include validation cycles that occur over zero-trust networks, in which the terminal device can decrypt its files.

For the initial setup, the enrollment cycle of file F, as described in Algorithm 4 below, starts with the generation from a randomly picked stream generating a public/private key pair Pk/Sk suitable for asymmetrical encryption algorithms. Examples of such algorithms may include but are not to be limited to RSA, ECC, Lattice-based algorithms, CRYSTALS Kyber and Dilithium, Falcon, SHPINCS, and classic McElice code. The private key Sk encrypts F to compute ciphertext C, and the public key Pk becomes message M. Algorithm 2 is then implemented to generate from C the orderly subset of f responses OSR: {r'1, . . . , r'j, . . . , r'f}, and to encrypt M. Three streams are randomly generated in the process: ω the nonce enhancing the one-wayness of the CRP mechanism, S the randomly picked seed needed for challenge generation, and ephemeral key K. The two subkeys are defined as follows:

Subkey Kr: The orderly subset of f responses $O_{SR}$: $\{r'_1, \ldots, r'_j, \ldots, r'_f\}$.

Subkey Kc: The data stream {S, ω, M*}

F and Kr are kept by a secure server, while C and Kc are distributed to the terminal device.

Algorithm 4: Enrollment Cycle for file F and Generation of Subkeys Kc and Kr

1) Input data: F
2) Randomly pick 256-bt long nonce {ω}
3) Randomly pick stream {S}
4) Let seed L = randomly picked 256-bit long stream
5) Generate ephemeral key pair Sk/Pk (example: PQC algorithm) from L
6) Let C = file F encrypted with key Sk
7) Let M = Pk
8) Use Module 1: Generate a set of N responses with C and {ω, S}
   a. Enter fixed input data: d, N, P, α, and β
   b. Output: N, P-bit long responses $\{r_1, \ldots, r_i, \ldots, r_N\}$
9) Use Module 2: Generate a subset of responses from M = Pk and $\{r_1, \ldots, r_i, \ldots, r_N\}$
   a. Erase {Sk, Pk, K}
   b. Output: {M* = M encrypted with K} and the f responses $\{r'_1, \ldots, r'_j, \ldots, r'_f\}$
10) Let subkey Kr = f, P-bit long responses $\{r'_1, \ldots, r'_j, \ldots, r'_f\}$
    a. Distribute to server: F and Kr
11) Let subkey Kc = streams {S, ω, M*}
12) Distribute to terminal: C and Kc

END

When decrypting the digital file C to recover F in a noisy network, the server initiates the decryption cycle by transmitting subkey Kr to the terminal device through the noisy network. The noisy (or hostile) network can be expected to corrupt and otherwise introduce errors in Kr. For example, the noise can result in the injection of up to 25% bad bits in Kr. As shown in the decryption algorithm of Algorithm 5, the terminal device can decrypt C by using both subkeys Kc and Kr and the file-based CRP mechanism. Finding the ephemeral key K enables the recovery of the public key Pk then the deciphering of C to find F. The decryption scheme is remarkably insensitive to noise introduced into subkey Kr.

Algorithm 5 is similar to Algorithm 3, above; however, one major difference is the recovery of K has to accommodate a large rate of erratic bits in Kr and therefore, in the orderly sequence of f, P-bit long responses. A primary advantage of the inventive methods are the methods allowing a successful recovery of K from noisy Kr which are described in detail below.

zero-trust network with poor signal quality. In this example, the vehicle has a set of encrypted files with instructions and the software revisions needed to react to certain circumstances. The set of keys needed to decrypt these files should not be stored in the vehicle for security reasons; therefore, a server transmits them through the open network as requested. The latencies of the suggested protocols should be small for near real-time operations.

Enrollment cycle. The enrollment cycle follows the protocols described previously and as shown in FIG. 1. The CRP processing allows the encryption of each file with its secret key and the generation of the two sub-keys Kc and Kr that are needed to recover the public key Pks, thus the original files. After enrollment cycle, the terminal device stores the encrypted files $\{C_1, C_i, C_k\}$ and subkeys $\{Kc)_1, Kc)_i, Kc)_k\}$ in a look-up table; the server stores the original files $\{F_1, F_i, F_k\}$ and subkeys $\{Kr)_1, Kr)_i, Kr)_k\}$.

Recovery of digital files. When the vehicle has a problem in the field, the engineers working remotely decide that the Algorithm 5: Decryption of file F with Subkey Kc and Noisy Subkey Kr

```
* assume that ~25% of bad bits are injected into Kr
  1) Enter variable input data: C, Kc, and the noisy Kr
  2) Use Module 1: Generate a set of N responses with C and {ω, S}
       i.   Enter fixed input data: d, N, P, α, and β
       ii.  Output: N, P-bit long responses {r_1, ..., r_i, ..., r_N}
  3) Use Module 4: Decrypt M from M* and the f noisy responses {r'_1, ..., r'_j, ..., r'_f}, j ∈ {1, P}
       i.   Retrieve key K by comparing the N responses r_1 with the subset of f responses r'_j
              i.  It is a "1" when r_1 has more than 75% bits matching with one noisy response
              ii. It is a "0" when r_1 has less than 75% bits matching with one noisy response
       ii.  Let M = Pk = M* decrypted with K
  4) Let F = C decrypted with K
  5) Output: F, Pk
END
```

Secondary key exchange. Iterative one-way function-based cryptography can be added to the above protocol to enable the protocol to exchange a secondary key in a similarly noise-tolerant way. During enrollment, the ephemeral key K can be recursively subjected to a cryptographic one-way function H(x) (e.g., a hash function) some i number of times to obtain a repeatedly hashed digest $D=H(K)^i$. For example, if the secondary key i=5, then $D=H(H(H(H(H(K)))))=H(K)^i$. This multi-hashed digest D is transmitted along with the subset of responses $K_r$.

Once the terminal device has recovered the ephemeral key K according to the previously described protocols, the secondary key is recovered by a function-compare iteration. For this iteration, K is repeatedly cycled through H(x) j times (starting with $H(K)^{j=1}$) and at each step the new digest is compared to the received digest D until a matching digest is found within a specified error tolerance. Once a matching digest is found, the value of the iteration counter j will be equal to the secondary key, because $H(K)^{j=i}\cong D$.

An example use case of remote command to decrypt files located in a noisy/hostile environment will now be described. While this use case involves decrypting files stored in an autonomous vehicle, it will be recognized that this technique may be used in countless other situations in which a central or ground authority wants to command a terminal device to decrypt a stored encrypted file, and the transmission conduit between the two devices is untrusted.

Embodiment to Protect Autonomous Vehicles

Figure 2:
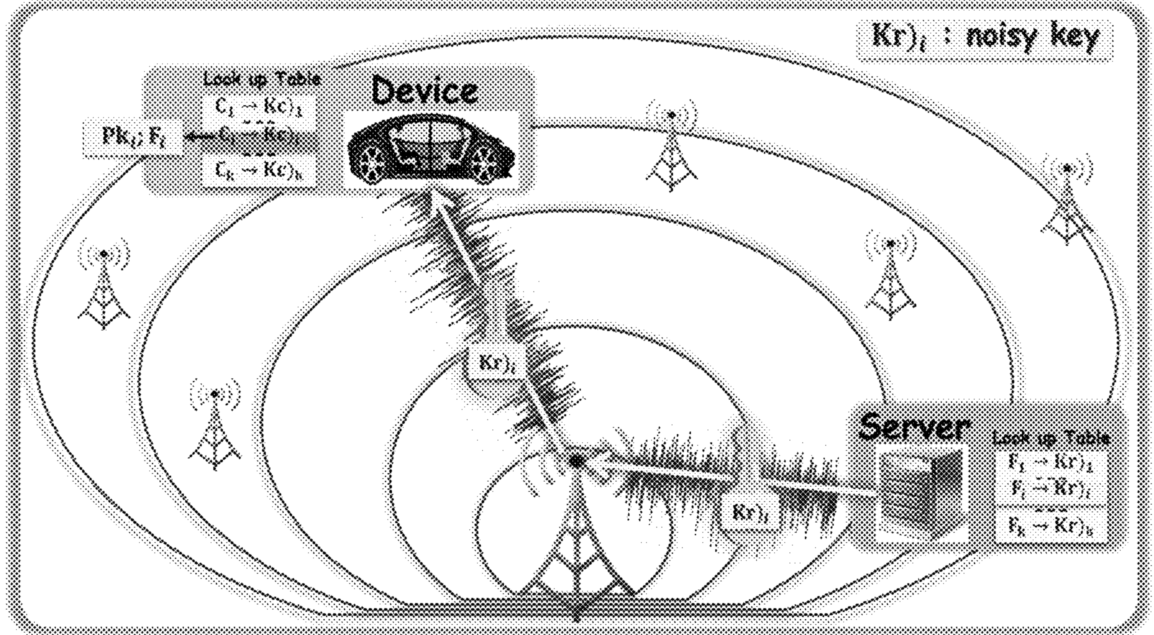
FIG. 2 conceptually depicts the distribution of information, which may occur over a noisy or hostile channel, to enable a terminal device to decrypt previously stored files.

The protocol presented above in the previous section can be applied to protect autonomous vehicles operating in a vehicle should use file $F_i$, therefore the transmit Kr); through the zero-trust network (FIG. 2). Assuming that the rates of collisions between responses are low, the vehicle finds Kr); by testing a few subkeys. Following the protocol presented previously, the device can manage poor signals and errors in the subkey Kr); to retrieve $F_i$ in the following way:

$Kc)_i$, i.e. $\{S,M^*\}_i$, allows the generation of the full set of responses from $C_i$.

$Kr)_i$ discloses the subset of responses $O_{SR})_i$.

Ephemeral key $K_i$ is retrieved by comparing both sets of responses.

Public key $Pk_i$ is decrypted from $M^*_i$ with key $K_i$.

File $F_i$ is decrypted from $C_i$ with public key $Pk_i$

If needed, the noise can be directly injected into Kr by the server with a random number generator. The autonomous vehicle can also be equipped with the system to emit obfuscating noise during communication with the server which has the potential to mitigate some side channel attacks. Having noisy responses can increase the one-wayness of the CRP mechanism, by obfuscating the cryptoanalysis after verification cycle. Without such a feature, the hostile crypto-analyst could keep track of the challenge-response-pairs for future analysis.

Reduction of BERs During Key Recovery Cycles of Keys

Practical issues are expected in the embodiment of the methods described above if the noise injection in subkeys Kr, the orderly subset of responses ($O_{SR}$), is above an acceptable threshold T. Excessive BERs in K could generate some bad bits in key K during the recovery cycles such as the one of Algorithm 5. The key K is feeding cryptographic algorithms that usually does not tolerate a single bad bit.

Iterative Process to Accept Large BERS in Subkeys Kr

One remedy to the aforementioned problem is to tolerate a partial matching between the responses of the orderly subset generated during enrollment ($O_{SR}$) and the full set of N responses generated during the verification cycle. Assuming that threshold T is the satisfactory number of acceptable bad bits in each P-bit long responses of Kr, the key K is retrieved by comparing the N responses with $O_{SR}$, as shown in Algorithm 6:

| Algorithm 6: Accepting T Erratic Bits in Subkey Kr |
|---|
| 1) Enter both sets $\{r_1, \ldots, r_i, \ldots, r_N\}$ and $\{r'_1, \ldots, r'_j, \ldots, r'_f\}$ and T |
| 2) Start with j = 1 and i = 1 |
| 3) If i = N: Stop; The output stream is the full key K |
| 4) If i < N + 1: Compare $r'_j$ with $r_i$ |
| a. If no more the T bits are different: The bit position i of K is a 1, and proceed back to step 3 with j = j + 1 and i = i + 1 |
| b. If more than T bits are different: The bit position i of K is a 0, and proceed back to step 3 with the same j and i = i + 1 |

The small example shown in the tables of FIGS. 4 and 5 explains how the scheme works with the sequence $\{r_1, \ldots, r_8\}$, key K {0, 1, 1, 0, 1, 0, 0, 1}, and the $O_{SR}$ of $\{r'_1=r_2, r'_2=r_3, r'_3=r_5, r'_4=r_8\}$. The key K is recovered by comparing the $O_{SR}$ and the full sequence.

However, if the threshold T of acceptance is too high, the probability of having two randomly chosen responses matching could become excessive. The term commonly used to describe unwelcome matches is "collision". To optimize the protocols, several error management schemes able to process small residual erratic are presented below. They can replace heavy ECC techniques while eliminating the need to use fuzzy extractors, AI, and data helpers.

Use of Ultralight Response-Based Cryptography to Recover Erratic Keys

Response-Based Cryptography (RBC) allows the recovery of erratic keys when the ciphertext of the keys is known. Let us adopt the following: D(a, k) means decrypt stream "a" with key "k". In the protocol of Algorithm 5, Pk=D(M*, K), F=(C, Pk), then F=D(C, D(M*, K)).

Algorithm 7 used to decrypt Pk and F with the RBC is:

| Algorithm 7: Managing Erratic Keys K with RBC |
|---|
| 1) Retrieve K with CRP mechanism and from file C |
| 2) Start with x = 0 |
| 3) Find all keys Kn, $n \in \left\{1, \frac{N}{x}\right\}$, with Hamming distance of x from K |
| 4) Decrypt all files Fn = D(C, D(M*, Kn)) |
| a. If one of the files Fn is readable, then: |
| i. Pk = D(M*, Kn) |
| ii. F = Fn = D(C, Pk) |
| iii. Stop algorithm |
| b. If none of the files Fn are readable, then: |
| i. If x < 3, then go back to step 3 with x = x + 1 |
| ii. If x = 3, then ask for a different noisy Kr and stop algorithm |

The throughput of the RBC was experimentally measured at 2×10-8 cycles per second for AES, and 2×10-5 for CRYSTALS-Dilithium (FIG. 6). The code tested for Dilithium is the one freely available online, while AES is implemented in hardware with commercially available laptops. The latencies to retrieve F through Algorithm 6 are shown in the table of FIG. 6 for 256-bit long responses where the latencies to retrieve F are acceptable.

Method to Detect Collision Between Responses

The method to detect relatively high levels of collisions is presented here. The approach is based on the observation that when a collision occurs between a response from the subset, and a response from the full set positioned in one of the states of 0 of K, there is also a match with a response positioned in one of the states of 1 of K: this response from the subset then has multiple matches. Conversely, without collision, each response from the subset has only one match in the full set of responses. After experimentally finding the x positions of the subset with multiple matches, it can be concluded that all other positions (the number of which is f−x) are error-free. This greatly limits how many possible keys must be tested in a methodology like the one described by RBC. For example, if one response of the subset sees two matches, the first of the two can be a state of 1, while the second one is a state of 0, or the opposite. This leaves only two possible keys, which are quick to validate by computing F with Algorithm 6. When x responses from the subset create collisions, the number of possible keys to check is 2x, which is much lower than the number of configurations needed by the brute force RBC for the same higher error rates. The latencies for 256-bit long keys K are shown in the table of FIG. 7.

Another problem to anticipate is the one where the errors injected in the responses of the subset are greater than threshold T. In this case, x responses see no matches. This type of failure creates only a limited number of possible keys K. The positions in the sequence of orderly response matching with response located positions (x−1) and (x−2) are known, and only a small number of positions with state 0 are between the two. The number of possible keys is then also small, and easy to validate with equation (6). The method to handle collisions and failures to detect matching responses can be combined in the following way:

Detect the responses of the subset with either zero or two matches with the responses of the full set of responses;

List all possible keys; and

Verify the authenticity of F with all possible keys with Algorithm 6.

Algorithm 8 presents one method to detect and correct both collisions and failures to detect matches.

Algorithm 8: Detecting and Correcting Errors During Recovery of K

1) Enter both sets $O_{SR} = \{r'_1, ..., r'_j, ..., r'_J\}$, full $SET_N = \{r_1, ..., r_i, ..., r_N\}$, and T
2) Start with j = 1 and i = 1
3) If i = N + 1, then go to step 5
4) If i < N + 1, then compare $r'_j$ with all 6 positions $r_{i+k}$ with k ∈ {0, 5}
    a. If no more than T bits are different between $r'_j$ and $r_{i+k}$, then the bit at position (i+K) could be a 1; record the finding.
    b. If more than T bits are different between $r'_j$ and $r_{i+k}$, then the bit at position (i+K) could be a 0 record the finding.
    c. If at least one ore more positions (i+K) are at 1, then find the position with the smallest number $k = k_{min}$ and go back to step 3 with j = j + 1 and $I = i + k_{min} + 1$.
    d. If all 6 positions of K are at 0, then assume that one of the positions should be a match; go back to step 3 with j = j + 1 and i = i + 1.
5) Analyze recorded matches:
    a. The positions $r'_j$ of $O_{SR}$ with only one matching response are considered correct
    b. The positions $r'_j$ of $O_{SR}$ with two matching responses have at least one collision
    c. The positions $r'_j$ of $O_{SR}$ with no matching responses are caused by more than T errors
6) Compute all possible keys Kn from the analysis
7) Decrypt all files Fn = D(C, D(M*, Kn)
    a. Find file Fn readable
    b. Pk = D(M*, Kn); F = Fn = D(C, Pk)
8) Stop Such a method does not need data helpers, fuzzy extractors, AI, nor other ECC-based complexity. The combined method will not work when both collision and failure to detect such occurs with the same response of the subset. When BERs are in the $10^{-3}$ range the probability of such an event is in the $10^{-6}$ range. In this configuration, the response in question is matching with one and only one response of the full set of responses, and the key has two hard to detect errors. The only solution left is to perform a brute force RBC search, and in case of a failure to recover K, to ask for a new subset of response and try again.

Method to Generate the Highest Level of Matching Keys

To recover the key, the first step involves analyzing responses with orderly noisy subsets. If the subset matches with only one response in a particular search window, mark the index of the matching response as a 1, and the rest of the indices leading to that matching index are assigned 0. If there are zero or more than one matching responses, then the highest level of matching method is used where the response that exhibits the minimum Hamming distance with a response from the subset is assigned a value of 1, while those with greater Hamming distances are assigned a value of 0. This approach significantly reduces the time needed to find the correct key, as there is a high likelihood that the first key obtained will be a suitable match. If the first key does not prove successful, subsequent methods can be employed for further attempts at decryption.

Figure 3:
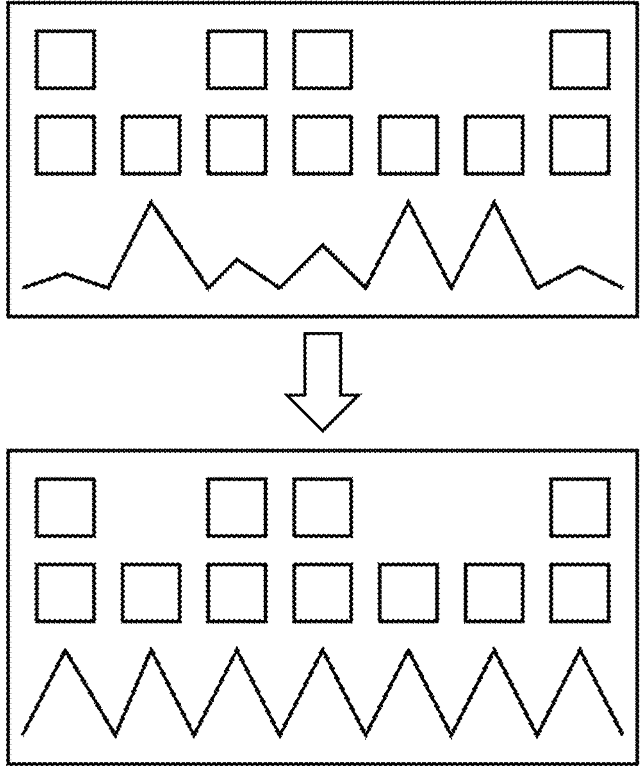
FIG. 3 illustrates the noise insensitivity of the described embodiments.

Noise could be injected into the subset responses to make key recovery harder for an unintended party. If the opponent generates a response with higher error than the real response, the injected noise should bring the error for the subset checks on level with the rest of the checks, effectively removing the local minima (FIG. 3). Noise injection can also be used for this purpose with any of the other recovery methods described previously.

When injecting noise into the subset of responses, the error tolerance used to find a match must be dynamically updated. The table of FIG. 8 gives an example of this using 10% as the starting tolerance.

It should be understood that, unless explicitly stated or otherwise required, the features disclosed in embodiments explicitly described herein and elsewhere in this disclosure may be used in any suitable combinations. Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method of managing access to a digital file F in a computing environment, comprising an enrollment procedure comprising:

generating a random bitstream L;

using L as a seed input to an asymmetrical encryption algorithm to generate a key pair having a secret key Sk and a public key Pk;

encrypting F with the secret key Sk resulting in an encrypted file C;

generating an encryption key K, and encrypting Pk with K resulting in M*;

generating an ordered sequence of challenges to a Challenge-Response Pair (CRP) generation mechanism;

applying the ordered sequence of challenges to the CRP generation mechanism to generate a first full ordered sequence of responses;

selecting responses within the first full ordered sequence of responses that have positions in the ordered sequence that correspond to positions of a first binary symbol in K, resulting in an ordered subset of responses Kr;

storing Kr in non-volatile storage at a first computing device; and storing Kc and C in non-volatile storage at a second computing device, where Kc comprises information usable to regenerate the ordered sequence of challenges to the CRP generation mechanism and M*.

2. The method of claim 1, further comprising storing the digital file F at the first computing device.

3. The method of claim 1, wherein the asymmetrical encryption algorithm comprises one of RSA, ECC, a Lattice-based algorithm, CRYSTALS Kyber, Dilithium, Falcon, SHPINCS or classic McElice code.

4. The method of claim 1, wherein the CRP generation mechanism comprises a physical object.

5. The method of claim 4, wherein the physical object is a biological object or an addressable array of physical unclonable function devices.

6. The method of claim 1, wherein the CRP generation mechanism is a digital file C* comprising an ordered sequence of segments.

7. The method of claim 6, further comprising generating C* by steps comprising:

generating a random nonce ω; and subjecting the encrypted file C to a hashing algorithm and concatenating the resulting hash with random nonce ω.

8. The method of claim 7, wherein the hashing algorithm is SHA-256.

9. The method of claim 7, further comprising extending C* with an extendable output function until it reaches a predetermined bit length having d segments.

10. The method of claim 9, wherein the extendable output function is SHAKE.

11. The method of claim 6, wherein generating an ordered sequence of challenges to a CRP generation mechanism comprises:

generating a random bitstream S;

generating a bitstream S* based on S, where S* has a predetermined bit length; and diving S* into challenge segments, each segment encoding an address of one of the segments of C*.

12. The method of claim 1, further comprising a method of decrypting an encrypted file C, encrypted according to the method of claim 1, comprising:

receiving Kc and using Kc to generate the ordered sequence of challenges to the CRP generation mechanism;

applying the ordered sequence of challenges to the CRP generation mechanism to generate a second full ordered sequence of responses;

receiving Kr, and comparing the ordered subset of responses to the second full ordered sequence of responses to identify positions in the second full sequence of responses for which there are matches in the ordered subset of responses;

constructing a key having a first binary symbol in positions corresponding to matches between responses in the second full sequence of responses and the ordered subset of responses, and a second binary symbol for non-matching positions;

using the key to decrypt M* resulting in Pk; and using Pk to decrypt C.

13. The method of claim 12, wherein identifying positions in the second full sequence of responses for which there are matches in the ordered subset of responses comprises computing a Hamming distance between each response in the ordered subset of responses and each response in the second full sequence of responses and identifying a match where the Hamming distance is below some threshold.

* * * * *